Aug. 9, 1932.    R. G. BERTHOLD    1,870,888
CONTROL METHOD AND APPARATUS
Filed Aug. 20, 1929    2 Sheets-Sheet 1
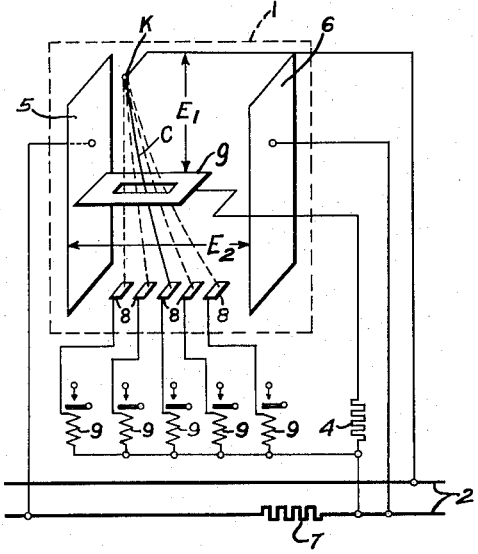
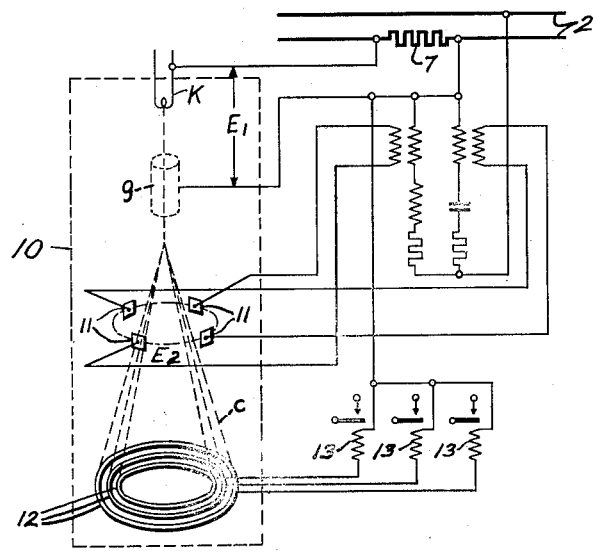
INVENTOR
Rudolf G. Berthold
BY
ATTORNEY INVENTOR
Rudolf G. Berthold Patented Aug. 9, 1932

1,870,888

UNITED STATES PATENT OFFICE

RUDOLF G. BERTHOLD, OF BERLIN-SIEMENSSTADT, GERMANY, ASSIGNOR TO WESTING-HOUSE ELECTRIC & MANUFACTURING COMPANY, A CORPORATION OF PENNSYLVANIA

CONTROL METHOD AND APPARATUS

Application filed August 20, 1929, Serial No. 387,256, and in Germany August 21, 1928.

My invention relates to control and more particularly to a method of and apparatus for producing a movement in accordance with the quotient of the magnitudes of a plurality of quantities.

In accordance with my invention, a plurality of fields, for example two, of changing magnitudes influence the position of an electric current in space from a definite path. The deflection of the current is made visible for indicating purposes and for initiating a control such as a relay.

One form of my invention is based on the laws of motion developed by the electron theory of cathode beams that are under the influence of a plurality of electric or magnetic fields of different direction. The theoretical consideration of these laws results in a movement involving the quotient of the field magnitudes. The deflection of a cathode beam transversely to the original direction of the moving electrons is proportional to the quotient of the magnitude of the field producing the transverse deflection by the magnitude of the original accelerating field. In the case of magnetic deviation no direct proportionality is present and therefore it is necessary to take into consideration the quotient of the root of the original field and the deviating magnetic field.

Such physical phenomena are utilized by my invention in the construction of an automatic quotient measuring instrument.

In accordance with my invention, one of the quantities develops an electric field that influences the velocity of the particles of an electric current, while the other quantity produces a deflection of the convection current by means of a second electric or magnetic field preferably lying at right angles to the first electric field.

The deflection of the convection current may be made visible by providing a light screen or by a series of electrodes lying side by side upon which the cathode beam impinges in accordance with the magnitude of the quotient of the fields or the deflection of the beam. To each electrode there is connected an indicating or control device such as a relay that responds to the impingement of the cathode beam. The movement of the cathode beam may also serve to release another convection current, for example, it may release secondary electrons from a cold electrode, which then move away toward a third electrode. The arrangement may also be such that the cathode beam substantially increases the volume of gas lying in its deflected path, so that current can flow only during passage of the beam between two electrodes located at this place and maintained at a constant difference of potential. By means of the secondary current thus produced by the cathode beam, a light screen may be illuminated or an indicating device actuated.

In determining the quotient of direct current quantities, one of the quantities may be employed to establish a voltage between the cathode and the grid of an electron tube, while the other quantity is used to produce a second electric field, preferably at right angles to the first electric field. A light screen or a plurality of electrodes beside each other are disposed opposite the grid parallel to the direction of the second field. An indicating device is connected to said screen or electrodes which respond when a cathode beam impinges on the corresponding electrode.

In determining the quotient of alternating current quantities which is nearly always the case in systems using quotient control measuring instruments and relays, a changeable phase displacement takes place in addition to the changing magnitude of the vectors. The phase shift varies in accordance with the load condition of the alternating current network. The instantaneous ratio between voltage and current, for example, unlike the amplitude ratio, is not definitely determined by the load of the network. An instantaneously indicating quotient responsive instrument is, therefore, not capable of distinguishing between the changes of the quotient due to phase shifting and the change of the quotient of the amplitude corresponding to network load, if it were constructed simply in accordance with the above principle.

In accordance with my invention, therefore, one of the quantities is caused to develop an electric or magnetic field that is stationary in space, while the other quantity is caused to develop a rotary field of constant amplitude, preferably at right angles to the first field, and moving in space. The generation of the rotary field may be produced by any desired artificial arrangement.

The rotary field generates a lateral force in accordance with its magnitude, the direction of which, however, rotates with the frequency of the alternating current of the network in the plane of projection of the lateral deflection. Since the original speed of the cathode beam is made dependent on the other field magnitude, the laterally deflected cathode beam describes a closed curve, such as a circle or an ellipse, the instantaneous radial dimension of which is proportional to the quotients of the two fields.

If a plurality of annular concentric electrodes are disposed in the plane of the curve, the cathode beam would impinge upon one of the electrodes depending upon the field ratios. Since the annular electrodes have rotational symmetry, it is immaterial that phase changes occur in the system.

The above principle may be effectuated by using constantly accelerated charged particles. For example, an axially tensioned filament may be caused to emit electrons through a constant radial electric field that may be produced by a grid concentrically surrounding the filament. These radially emitted electrons may then be accelerated outside of the grid by another radial electric field to make the cathode beam stiffer. If an electric or magnetic field is caused to operate at right angles to the cathode beam, that is axially, which field is dependent on the other quantity, then the cathode beam describes a surface of rotation, the height of the section of which is proportional to the quotient of the two deflecting fields. If the first accelerating field is a constant rotary field, then its radial force is constant so that no change in its radial force takes place upon phase displacement, where one provides that the lateral deflection may affect the radial beam only where it is present.

The fields which produce the deflection of the moved particles may be formed in the deflection space in accordance with a logarithmic or a like function in order to cover a larger range of measurement.

It will be apparent that it is not absolutely necessary that the convection current issue from a glow cathode, as obviously any device for emitting a convection current can be used, for example, a glow discharge.

To avoid influencing the convection current by the potential distribution of the unimpinged electrodes which serve for deflecting the cathode beam, and also to render relatively harmless the potential charge which begins on the impinged electrode when a current begins to flow, separate protective grids may be arranged around the contact electrodes, or one may operate with very small convection currents and provide amplifying devices responsive to very small potential fluctuations.

Modifications of my invention are illustrated in the accompanying drawings, in which Figure 1 is a schematic view of apparatus for measuring the quotient of direct current quantities.

Fig. 2 is a view similar to Fig. 1 of apparatus for measuring the quotient of alternating current quantities.

Figure 3:
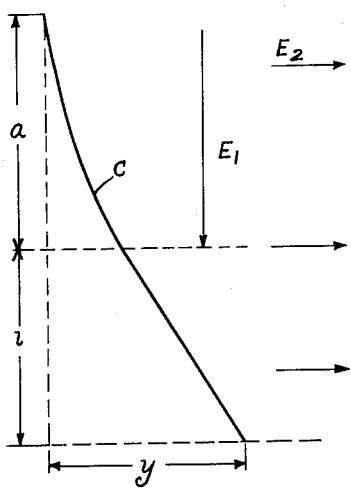
Fig. 3 is the chart of the curve of the convection current of the D. C. apparatus illustrated in Fig. 1.

Referring to Figs. 1 and 3, electric fields $E_1$ and $E_2$, that are at right angles to each other produce a deflection $y$ of the electric current C.

The electric field $E_1$ is effective within the distance $a$. The indicating device is at a distance $l$ from the end of the effective field $E_1$. From this relation the following formula is obtained:

$$y = \frac{E2}{2E_1}\left(\frac{a^2}{2} + al\right)$$

Figure 4:
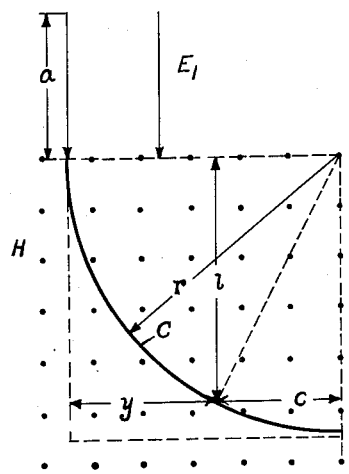
Fig. 4 is the chart of the curve of the convection current of the A. C. apparatus illustrated in Fig. 2.

If desired, one of the electric fields may be replaced by a magnetic field. Referring to Fig. 4, the electric field $E_1$ and the magnetic field $H$ at right angles thereto, produce a deviation of the electric current C as shown. The electric field $E_1$ is effective within the section $a$ and the indicating device is a distance $l$ from the effective field $E_1$. The electric current C is deflected in accordance with a circular curve with a radius $r$. From this relation the following formula is obtained:

$$y = r - c = r - \sqrt{r^2 - l^2}.$$

$$r = \frac{\sqrt{2mE_1}}{H} \frac{1}{l}$$

$$y = \frac{\sqrt{2mE_1}}{H\sqrt{e}} - \sqrt{\frac{2mE}{H^2 e} - l^2}$$

Fig. 1 shows the apparatus for obtaining the quotient of D. C. quantities, or in other words, the ratio of the voltage and the current of a network. Between a cathode K and a grid $g$ of an electron tube 1 there is applied the voltage $E_1$ of the network 2 through a resistor 4. The deflecting voltage $E_2$ is applied between the condenser plates 5 and 6. The voltage $E_2$ is obtained from the voltage drop in a resistor shunt 7 in the network 2 thereby making the voltage $E_2$ proportional to the current through the network.

The electrodes 8 are arranged opposite the grid $g$ and the relays 9 are connected thereto.

Fig. 2 shows apparatus for obtaining readings of the quotients of A. C. quantities. The voltage $E_1$ is produced by the voltage drop on the shunt 7 in the network 2 and is thus proportional to the current of the network. The voltage $E_1$ is applied to the cathode K and the grid $g$ of an electron tube 10. A rotary field $E_2$ is delivered by the voltage of the network 2 which is arranged in a well known manner to send two fractional currents differing in phase through the electrodes 11. Opposite the electrodes 11 are arranged electrodes 12 disposed in concentric rings with a relay 13 connected to each of said rings.

Figure 5:
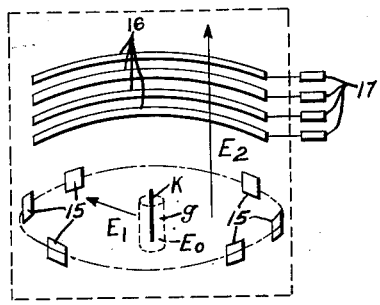
Fig. 5 is a view similar to Fig. 2 of a modification thereof.

Fig. 5 shows another modification of my invention for determining the quotient of A. C. quantities. A constant field $E_0$ is produced between the cathode $k$ and the grid $g$. A rotary field $E_1$ delivered by one of the A. C. quantities is located between the cathode K and electrodes 15. An electric field $E_2$ extends at right angles to the rotary field $E_1$. Parallel to the plane of the field $E_1$ there are arranged in superposition a plurality of electrode rings 16 of concentric formation, each of which is connected to a relay 17. For clearness the separate conductor connections are not shown, because they can be understood by reference to the previously described figures.

Figure 6:
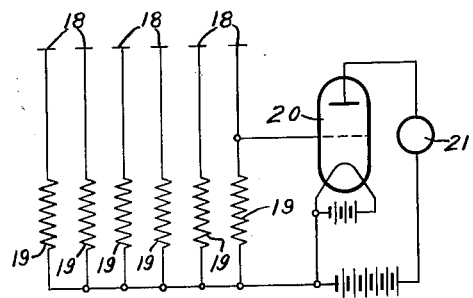
Fig. 6 is a diagrammatic view of a modification of the amplifying circuits.

Fig. 6 shows an arrangement in which the relays are not directly connected to the electrode rings, but the indicating currents are first amplified. Amplifying coils 19 are connected to the electrodes 18, the current flowing through which is amplified by an electron tube 20, causing a relay 21 to be actuated. For simplicity, only one electron tube 20 is illustrated.

The invention is not limited by the particular methods and apparatus which are herein described as various changes may be made within the scope of my invention as set forth in the following claims.

I claim as my invention:

1. Apparatus for determining the quotient of the magnitudes of two electric quantities comprising means for producing an electric current having a predetermined path, means for controlling the speed of said current in its path in accordance with one of said quantities, and means for deflecting said current from its path in accordance with the other of said quantities.

2. Apparatus for determining the quotient of the magnitudes of two electric quantities comprising means for producing an electric convection current, means for influencing the speed of said current in accordance with one of said quantities, means for producing a deflection of said current in accordance with the other of said quantities, and means for indicating the magnitude of said deflection.

3. Apparatus for determining the quotient of the magnitudes of two electric quantities comprising means for generating a cathode beam, means for controlling the speed of the electrons in said beam in accordance with one of said quantities, means for deflecting said beam in accordance with the other of said quantities, and means for indicating the position of said beam, said last means including a series of electrodes in the deflection path of said beam and electro-responsive means connected to each of said electrodes.

4. Apparatus for determining the quotient of the magnitudes of two electric quantities comprising means for generating a cathode beam, means responsive to one of said quantities for influencing the speed of the electrons in said beam and means for rotating said beam in accordance with the other of said quantities whereby it generates a cone, the dimensions of said cone indicating said quotient.

5. The method of determining the quotient of the magnitudes of a plurality of electric quantities independently of their phase relationship which comprises, generating a cathode stream, controlling the speed of the electrons in said stream in a predetermined direction in accordance with one of said quantities, deflecting and rotating said stream in accordance with the other of said quantities, and indicating the magnitude of the deflection of said stream.

6. The method of determining the quotient of the magnitudes of a plurality of electric quantities which comprises generating a cathode stream, controlling the speed of the electrons in said stream in a predetermined direction in accordance with one of said quantities, deflecting said stream in accordance with the other of said quantities, and indicating the magnitude of the deflection of said stream.

7. Apparatus for indicating the quotient of two electrical quantities comprising means for generating a beam of electrons, means for controlling the speed of said electrons in accordance with one of said quantities, means for deflecting said electrons in accordance with the other of said quantities, and means for indicating the magnitude of said deflection.

8. Apparatus for indicating the quotient of electrical quantities comprising means for generating a beam of electrons, means for controlling the speed of said electrons in accordance with one of said quantities, means for rotating and deflecting said electron beam in accordance with another of said quantities, and means for indicating the magnitude of said deflection.

In testimony whereof, I have hereunto subscribed my name this 23rd day of July, 1929, at Berlin-Siemensstadt, Germany.

RUDOLF G. BERTHOLD.